L. KAPPERTZ.
SNOW REMOVING DEVICE.
APPLICATION FILED MAR. 27, 1920.
1,435,476.
Patented Nov. 14, 1922.
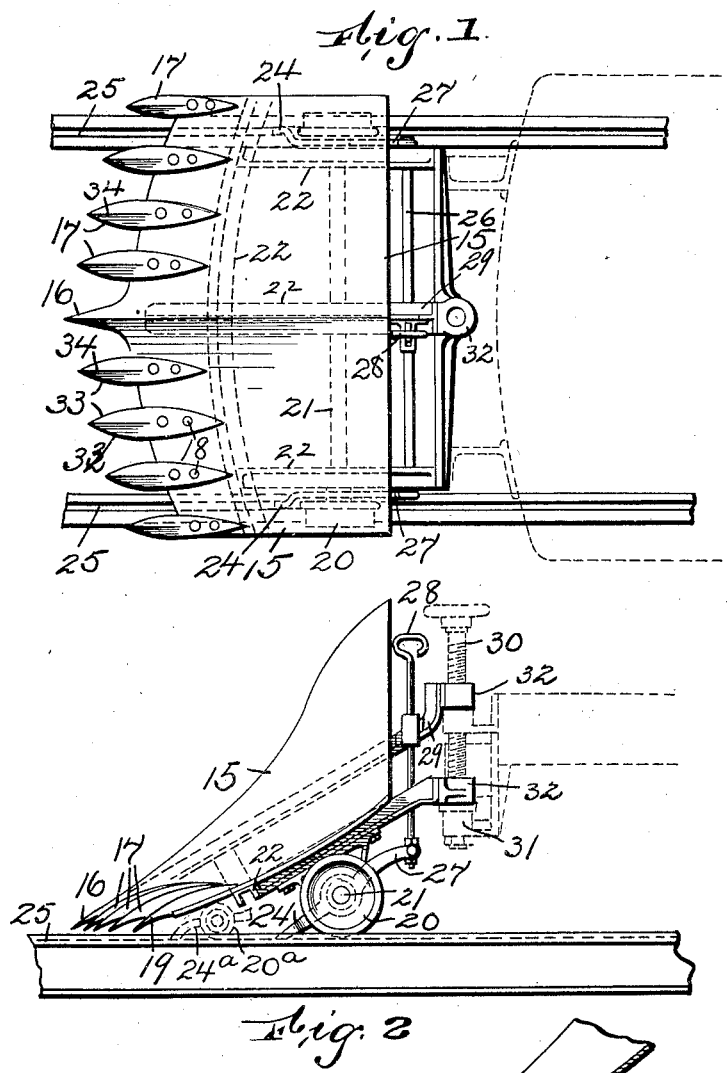
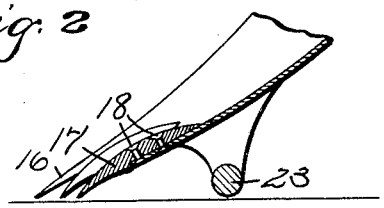
INVENTOR
Leo Kappertz.
BY
ATTORNEY Patented Nov. 14, 1922.

1,435,476

UNITED STATES PATENT OFFICE.

LEO KAPPERTZ, OF MORRISTOWN, NEW JERSEY.

SNOW-REMOVING DEVICE.

Application filed March 27, 1920. Serial No. 369,366.

*To all whom it may concern:*

Be it known that I, LEO KAPPERTZ, a citizen of the United States, and a resident of Morristown, county of Morris, and State of New Jersey, have invented certain new and useful Improvements in Snow-Removing Devices, of which the following is a specification.

This invention relates to an improved shovel or plow for removing snow, and is particularly adapted for removing very hard snow or ice, the body portion being constructed so that its front edge separates the mass into smaller particles by reason of the conformation thereof.

A further object of the invention is to provide an article of this kind which has a fulcrum on the under side in rear of the front edge, so that said front edge is not permitted to pass directly down into the mass, and in the case of very heavy snow or ice, layers thereof can be removed by the normal manipulation of the device.

The invention further consists of a plow which is adapted to not only remove snow and ice as above described, but to clean the slot of rails so as to prevent the derailing of cars propelling such plow.

The invention is further designed to provide a front edge to the shovel or plow which has teeth disposed so that they successively engage the ice or snow, being preferably arranged on the front edge so that the center tooth is the most advanced, but such disposition can be altered if desired.

I have found, with the use of such shovel, that by giving it a motion similar to that employed in the use of an ordinary shovel, the fulcrum in rear of the teeth assists in guiding the shovel so that successive layers are broken up into smaller pieces, wedged apart by the teeth, the downward inclinations of the teeth in use being counter-acted by the action of the fulcrum directly behind and in rear of the teeth, and the ice and snow are cleared away with much less labor and in much less time than with the ordinary form of shovel.

The invention is illustrated in the accompanying drawing, in which Figure 1 is a top view of a plow or shovel adapted for use on a vehicle such as a trolley car. Figure 2 is a side view of the apparatus shown in Figure 1, and Figure 3 is a section of the front lower part of a plow of a different form from that shown in Figures 1 and 2.

In the drawing I show a shovel or plow and I illustrate it as attached to the front of a car, the plow having the body portion 15 which is usually made pointed at the top, at the center, to form a ridge and thus throw the material to each side of the track, and is provided with the central point 16, and the curved edge on either side thereof is provided with teeth 17, which, in the case of a plow which does heavy duty, are preferably made solid, as shown in section in Figure 3, and are attached by suitable means, such as by the rivets 18, to the front edge of the body portion or scoop 16 and are preferably provided with a curved upper surface and are also provided with downwardly extending pointed front ends 19, so that each tooth, when it enters material such as ice or snow that has melted and has again been frozen, wedges the material apart and causes it to crack, thereby cutting it up into small pieces.

I have found by a test that such breaking up of the material can be brought about with but comparatively low power. The front edge is prevented from being forced upward by its engagement with material under the front edge of the teeth by a fulcrum which, in Figures 1 and 2, comprises small wheels 20 mounted on the axle 21 supported in the frame 22 of the plow, and in Figure 3 I show a modification in which a single bar 23 is fastened to the under side of the plow and extends transversely beyond the inner edge of the rail and preferably rides on the rail, so that a good bearing is provided for this fulcrum.

In case of the use of the wheels 20 they are preferably flanged wheels, the flanges riding in the groove of the rail, and I preferably provide fingers 24 which extend into the grooves 25 of the rails and co-operate with the plow, so that after the plow has removed the major portion of the material from the rail these fingers, passing through the groove, thoroughly clean it, so that the flanges of the wheels of the car can travel along the groove and will not be derailed, which very often occurs when frozen snow or sleet is permitted to congregate in said grooves.

The fingers 24 are preferably made so that they can be raised or lowered at will, the mechanism shown consisting of the bar 26 which connects the rear ends 27 of the arms 24 and is provided with a handle 28 which can be held in raised position by any suitable means such as teeth which engage the bar 29 of the frame 22. Any suitable means for raising and lowering the plow can be used, but I show one form in dotted outline in Figure 2 which consists of the screw 20, which rests on the bracket 31 and passes through the nuts 32 of the frame of the plow, and the elevation of the plow can thus be regulated.

The teeth 17 are preferably made with rounded side edges 33, and the front upper edge has a sharpened or pointed top surface 34, these co-acting to easily split ice and the like and also being adapted for the penetration of snow and making it possible to clear away obstructions that at present are not broken up by the usual form of snow plow.

It will be understood that minor changes can be made in the form of the parts and the arrangement thereof without departing from the scope of the invention.

The roller and the finger can be placed well forward and close up under the teeth, as indicated in dotted outline at 20ª and 24ª in Figure 2.

I claim:

1. A snow shovel comprising a body portion with teeth on its front edge, the teeth being disposed so that the center one is foremost, the teeth thus engaging the material successively, and a roller on each side of the body portion, each having a flange to roll in the groove of a rail.

2. A snow plow comprising a body portion having a central ridge and having its bottom edge sharp and provided with teeth, the teeth being rounded on the top and having a generally forward and downward inclination, said teeth being spaced apart, whereby the rounded top faces and the spaced disposition of the teeth allows transverse movement of dislodged pieces of ice, said teeth being arranged so that the central tooth is foremost, and supporting means under said body portion closely adjacent to the front thereof.

In testimony that I claim the foregoing, I have hereto set my hand, this 25th day of March, 1920.

LEO KAPPERTZ.